United States Patent [19]

Howes

[11] Patent Number: 5,264,928
[45] Date of Patent: Nov. 23, 1993

[54] UNIVERSAL ADAPTER FOR MOUNTING CAMERAS TO MICROSCOPES

[75] Inventor: Allen R. Howes, Walnut Creek, Calif.

[73] Assignee: Transamerican Technologies International, Pleasanton, Calif.

[21] Appl. No.: 906,885

[22] Filed: Jun. 29, 1992

[51] Int. Cl.⁵ .................. G02B 21/18; G02B 21/36; H06N 7/18
[52] U.S. Cl. ............................... 358/93; 358/97; 358/228; 358/229; 354/79
[58] Field of Search .................. 358/93, 97, 228, 229; 354/79

[56] References Cited

U.S. PATENT DOCUMENTS

| | | |
|---|---|---|
| 3,820,882 | 6/1974 | Jakubowski . |
| 4,143,938 | 3/1979 | Feinbloom . |
| 4,272,161 | 6/1981 | Feinbloom ........................ 358/107 |
| 4,300,167 | 11/1981 | Miller et al. ...................... 358/228 |
| 4,344,667 | 8/1982 | Wooff, Jr. ......................... 358/98 |
| 4,688,907 | 8/1987 | Kleinberg . |
| 4,781,448 | 11/1988 | Chatenever et al. . |
| 4,805,027 | 2/1989 | Sluyter ............................. 358/225 |
| 5,006,872 | 4/1991 | Parker ............................... 358/93 |

OTHER PUBLICATIONS

Carl Zeiss, Inc., Zeiss-Urban Dual Camera Adapter, 14 pages, describes Dual Camera Adapter with accompanying price lists.

Primary Examiner—Howard W. Britton
Attorney, Agent, or Firm—Townsend and Townsend Khourie and Crew

[57] ABSTRACT

An adapter system for mounting a video camera and optionally a 35-mm camera on a microscope beam splitter comprises a main body housing and a nose piece which is detachably secured in a main body housing. A plurality of lens cartridges may be mounted within the nose piece to focus light on a beam splitter mounted within the main body housing. The beam splitter provides an image along both an axial beam path and a transverse beam path relative to the main body housing. A video camera may be mounted on the transverse axis to receive and image with a magnification depending on the focal length of the lens cartridge. A 35-mm camera may be attached to the main body housing on the axial beam path to receive an image having a focally depending both on the lens cartridge as well as on a separate single or compound lens located between the beam splitter and the 35-mm camera. Conveniently, mounted rings for either a bayonet-type mount or C-type mount may be provided for receiving the video camera.

5 Claims, 3 Drawing Sheets

UNIVERSAL ADAPTER FOR MOUNTING CAMERAS TO MICROSCOPES

BACKGROUND OF THE INVENTION

1. Field of the Invention

The present invention relates generally to optical equipment, and more particularly to an adapter assembly suitable for mounting a video camera, or a video camera and 35-mm camera, to a medical microscope.

Medical and research microscopes frequently incorporate beam splitting assemblies to permit additional viewing, video, and camera attachment ports. Commonly available beam splitters provide a pair of optical attachment ports in addition to the primary viewing eye pieces.

In order to permit the attachment of more than one camera to a single optical port on a microscope beam splitter, the prior art has provide dual camera adapters which permit the attachment of both a video camera and a 35-mm camera to a single optical attachment port. Such dual video camera adapters are available commercially from suppliers such as Carl Zeiss, Inc., and are manufactured by Urban Engineering Company, Burbank, Calif.

While functional and useful, such conventional video adapters generally posses lenses which provide only one focal length for each of the video camera and 35-mm camera. Moreover, the video attachment receptacles are generally suitable for either a bayonet-type mount or for a C-type mount, but not both. Additionally, the dual camera adapters are generally capable of being mounted only on a particular brand of microscope Thus, a hospital or laboratory must posses numerous specific adapters in order to handle the various combinations of video camera, video camera magnification, 35-mm camera magnification, and brand of microscope employed.

A particular concern is the desire to provide different relative magnification for the video camera and 35-mm camera With present equipment, such a change in relative magnification requires that the entire video adapter be removed and replaced with a second video adapter in order to provide the necessary internal optics for the necessary focal length for each camera.

For these reasons, it would desirable to provide universal adapter systems which are capable of receiving a variety of different video cameras and/or 35-mm cameras and attaching said video and 35-mm cameras to different brands of microscope beam splitters. Such universal adapter systems should further provide for a wide range of different focal length magnifications for both the attached video camera and the attached 35-mm camera.

2. Description of the Background Art

Adapters for simultaneously mounting a video camera and a 35-mm camera on one side of a surgical microscope beam splitter are shown in U.S. Pat. Nos. 4,272,161 and 4,143,938. Such adapters are commercially available from Carl Zeiss, Inc., and manufactured by Urban Engineering Co., Burbank, California. Beam Splitters having integral video cameras are shown in U.S. Pat. Nos. 4,805,027 and 4,344,667. A beam splitter having three identical optical trains and four viewing stations is shown in U.S. Pat. No. 4,688,907. Automatic iris control systems for use with surgical microscope adapters are shown in U.S. Pat. Nos. 3,820,882 and 4,300,167. A zoom lens adapter for an endoscopic camera is shown in U.S. Pat. No. 4,781,448.

SUMMARY OF THE INVENTION

The present invention overcomes the limitations just described by providing a universal adapter for connecting video and/or 35-mm cameras to conventional microscope beam splitters. The adapters comprise a main body housing having an internal beam splitter oriented to receive light along an axial beam path from the conventional microscope beam splitter The adapter beam splitter reflects portion of the axial light along a transverse beam path. The adapter further comprises a nose piece assembly detachably mounted on the main body housing and having an adjustable iris disposed along the axial beam path proximate the connection to the microscope beam splitter. The adapter system still further comprises a plurality of lens cartridges which may be interchangeably mounted within the nose piece assembly. Typically, the cartridges are aligned along the axial beam path between the adjustable iris and the adapter beam splitter, and in this way different lenses having different focal length magnifications may be readily exchanged within the adapter. Thus, the need to maintain plurality of different adapters for each desired magnification is eliminated.

In a particular aspect of the present invention, a video mount receptacle is formed in the main body housing along the transverse beam path. The adapter system further comprises both a bayonet-type mount ring and a C-type mount ring, where both mount rings may be detachably secured within the video mount receptacle to permit attachment of virtually any type of video camera.

The adapter system will usually further comprise means disposed on or in the video mount receptacle for axially translating a mount ring secured therein. The axially translating means can provide for fine par focal length adjustment of the video camera mounted on the adapter.

In another aspect of the present invention, a 35-mm mount receptacle will be formed in the main body housing in alignment with the axial beam path on a side of the beam splitter opposite to the nose piece. A lens holder is detachably secured to the 35-mm camera mount receptacle, and a plurality of lens assemblies having focal lengths matched to the video lens cartridges are provided. In this way, a 35-mm camera can be attached to the video lens holder and a preselected lens assembly introduce to provide an appropriate level of magnification for the camera. A particular advantage of the present invention is that the magnifications of the video camera and the 35-mm camera can be independently selected.

DESCRIPTION OF THE SPECIFIC EMBODIMENTS

Figure 1:
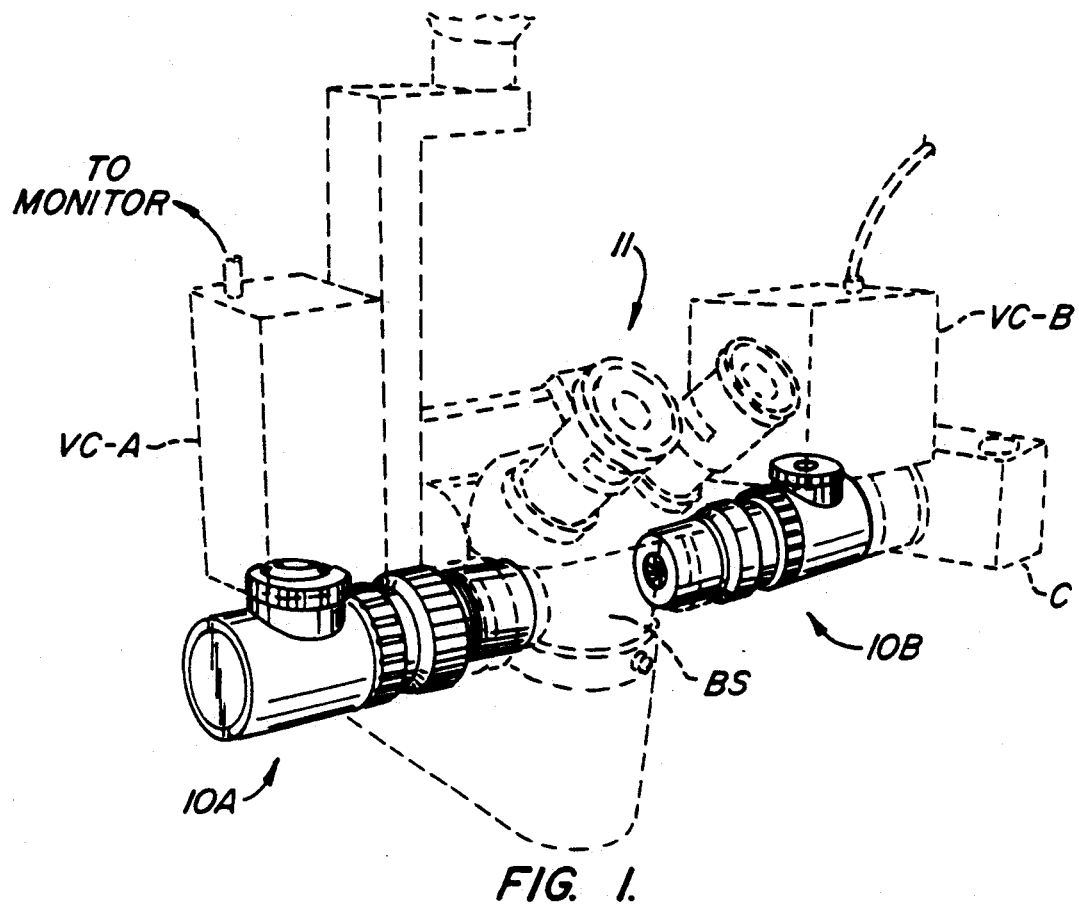
FIG. 1 is a perspective view illustrating a pair of camera mounting adapter systems constructed in accordance with the principles of the present invention and attached to a conventional microscope beam splitter, with the microscope beam splitter and cameras shown in phantom.

As illustrated in FIG. 1, a pair of video adapter systems 10 may be mounted on a single microscope beam splitter assembly BS. The microscope and beam splitter assembly BS are conventional equipment available from commercial suppliers, such as Carl Zeiss, Inc. The first video adapter system 10A has a video camera VC (shown in phantom) mounted thereon, while the second video adapter system 10B has both a video camera VC (shown in phantom) and a 35-mm camera C (also shown in phantom) mounted thereon As will be discussed in detail below, the video adapter systems 10 include a number of components which permit the selection of a variety of features to permit mounting of different video and/or 35-mm cameras, providing for different focal length magnifications and permitting the interconnection of a variety of equipment from different manufacturers Referring now to FIGS. 2-4, the basic construction of the video adapter system 10 of the present invention will be described. The essential components of the system 10 include a main body housing 12 which is generally cylindrical in shape and which defines an axial passage 14 which holds a beam splitter 16. As illustrated, the beam splitter 16 comprises a pair of opposed prisms, but it would also be possible to utilize a single prism, a partially reflective mirror, a pivotable mirror, or any equivalent structure which could reflect or partially reflect an incident axial beam 18 along a transverse beam path 20.

A nose piece assembly 24 is detachably secured to a proximal end of the main body housing 12, typically using a conventional locking ring 26. The nose piece assembly 24 also includes an axial passage 27 which is aligned with the axial passage 14 in the main body housing 12 when the nose piece assembly, is secured to the main body housing. A lens cartridge 28 is removably attached to the main body housing 12, typically by a threaded connector 30 which is received in a threaded receptacle 32 in the housing.

Figure 6A:
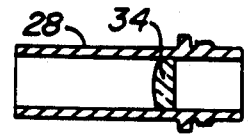
FIGS. 6A-6D illustrate a set of lens cartridges having different focal length magnifications in which may be mounted in the adapter system of FIG. 5.
Figure 6B:
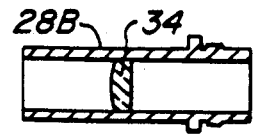
Figure 6C:
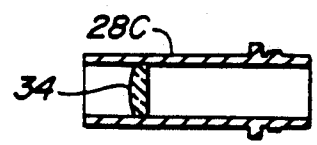
Figure 7A:
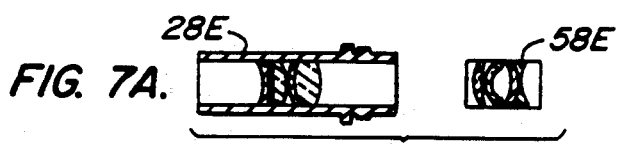
FIGS. 7A-7D illustrate a plurality of lens cartridges and matching lens assemblies which may be used in the adapter system of FIG. 5. When both a video camera and a 34-mm camera are mounted thereon.
Figure 6D:
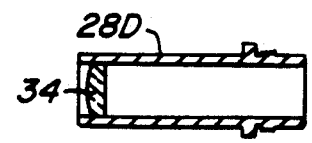
Figure 7B:
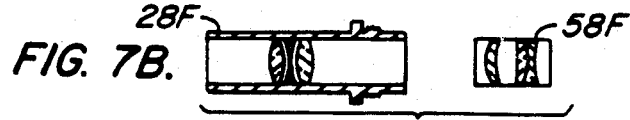
Figure 7C:
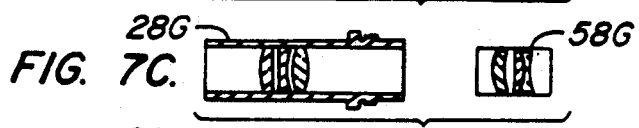
Figure 7D:
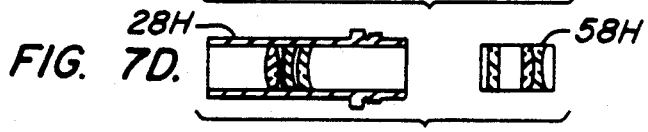

The lens cartridge 28 (FIGS. 4 and 6A) is essentially a hollow tube having a single or a complex lens mounted therein. As illustrated in FIGS. 6A-6D, the optics and axial position of a lens 34 within the cartridge 28 will each be varied in order to obtain different focal length magnifications for the attached camera or cameras FIGS. 6B-6D illustrate three other lens cartridges 28B-28D which are included as part of the preferred adapter system of the present invention.

The nose piece assembly 24 further includes an adjustable iris 36 mounted at the end of the nose piece which attaches to the microscope beam splitter BS. The iris is adjusted using adjustment ring 38 which is connected to the iris by a conventional linkage assembly including barrel 40 (FIG. 4).

Figure 2:
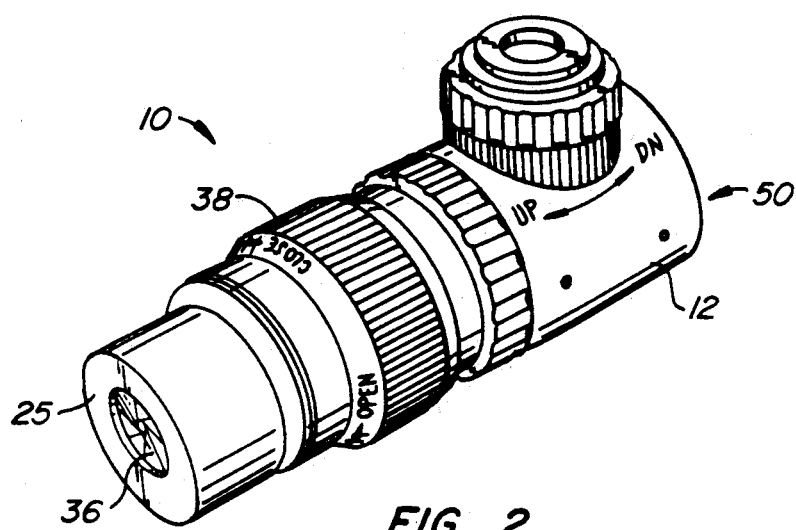
FIG. 2 is a perspective view of the camera mounting adapter system of the present invention shown in isolation.
Figure 3:
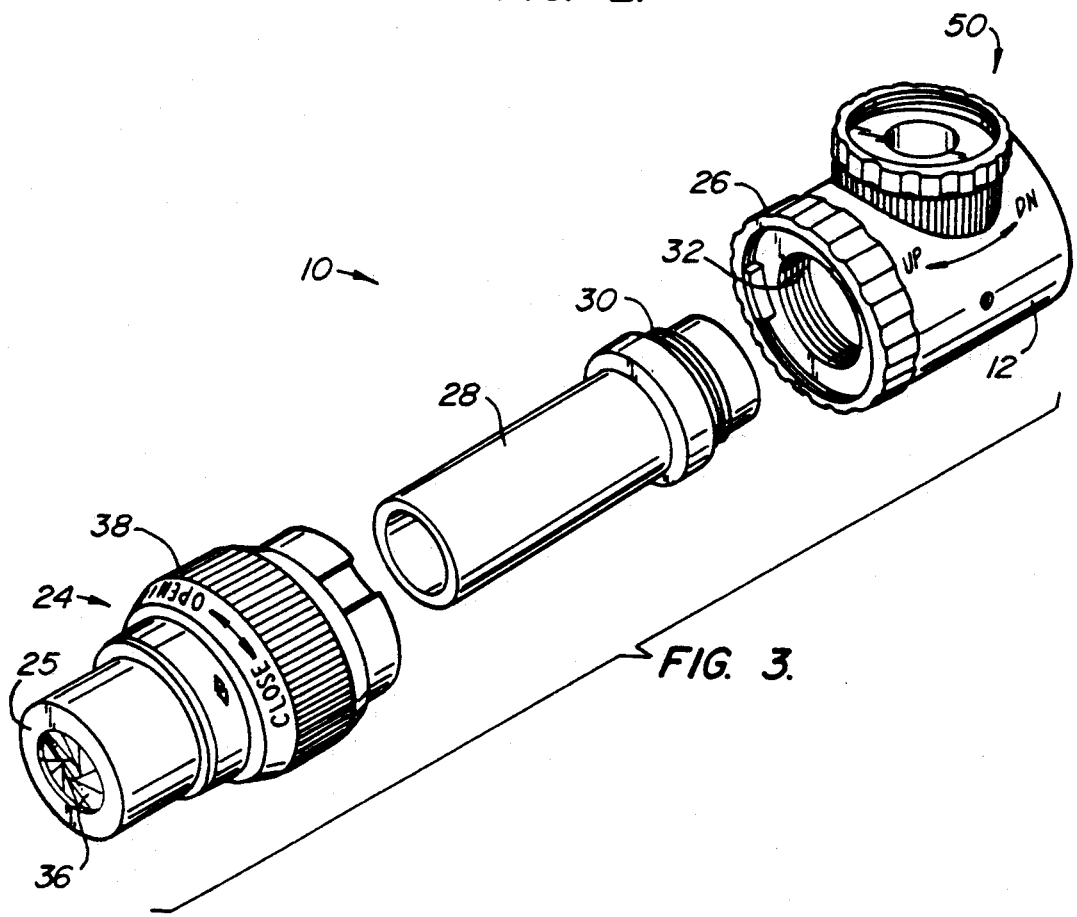
FIG. 3 is an exploded view of the camera mounting adapter system of the present invention.
Figure 4:
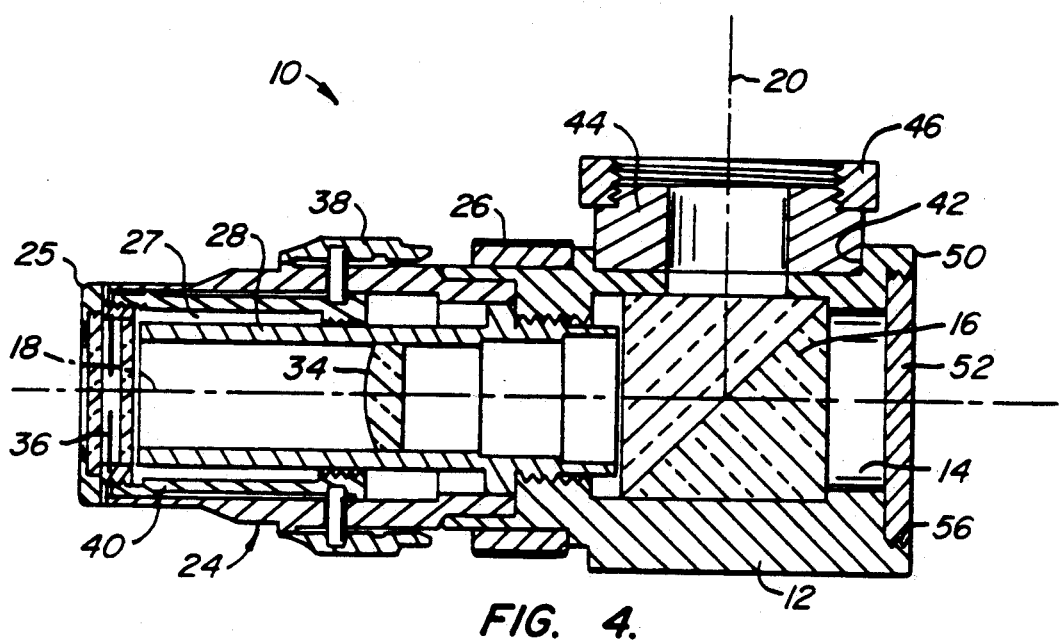
FIG. 4 is a cross-sectional view of the camera mounting adapter system of the present invention

A video mount receptacle 42 is formed in the main body housing 12 and receives a video mounting and focus assembly comprising base 44 and locking ring 46, as illustrated in FIGS. 3 and 4. The locking ring 46 is adapted to receive both a C-mount ring and a bayonet-type mount ring, as illustrated in FIGS. 2 and 5, respectively.

Figure 4A:
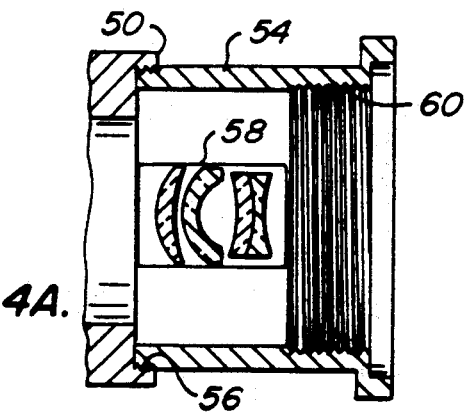
FIG. 4A is a cross-sectional view of a 35-mm mounting ring which may be attached to the adapter illustrated in FIG. 5.

Distal end 50 (FIG. 2) of the video adapter system 10 will be remote from the proximal mounting end 25 which is attached to the microscope beam splitter BS. As illustrated in FIGS. 2-4, the video adapter system 10 terminates in a threaded receptacle 56, which is shown with dust cover 52 in place in FIGS. 1 and 4. In order to attach a 35-mm camera, the dust cap 52 will be removed and replaced with a lens holder assembly 54 (FIG. 4A) which can be threadably inserted into a receptacle 56 formed in the main body housing 12. A single or compound lens 58 is replaceably mounted in the lens holder assembly 54 so that it will lie on the axial beam path 18 on the side of the beam splitter remote from the nose piece assembly 24. The lens holder assembly 54 includes means on its proximal end for securing a 35-mm camera body, typically a threaded receptacle 60 The nature of the receptacle, of course, will depend on the type of camera mount, and the adapter system 10 will usually include a plurality of lens holder assemblies 54 in order to accommodate different cameras.

The lenses 58 will be selected to be optically compatible with the lens cartridges 28 disposed in the nose piece 24, as described previously. Particular advantage of the present invention is that it will be possible to select the type of lenses 58 which can provide a variety of different focal length magnifications for the camera C mounted on the adapter 10 (as illustrated in FIG. 1). Particular lenses 58E-58H are illustrated in combination with corresponding lens cartridges 28E-28H in FIGS. 7A-7D While particular lens assemblies are exemplary, the present invention lies in the fact that the lenses associated with the video camera VC and 35-mm camera C can be independently selected to provide different focal length magnifications for each camera.

Figure 5:
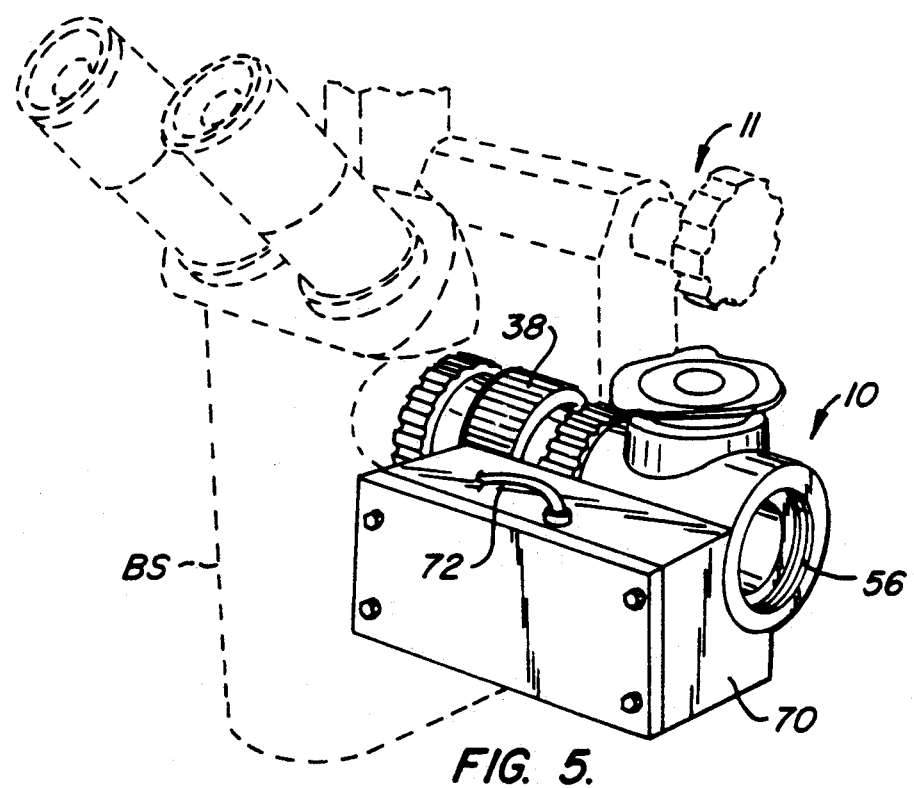
FIG. 5 is a perspective view illustrating a single camera mounting adapter system constructed in accordance with the principles of the present invention and having an automatic iris adjustment mechanism attached thereto.

Referring now to FIG. 5, the video adapter system 10 of the present invention may further comprise a motorized iris control mechanism 70. The control mechanism 70 provides an internal drive wheel (not illustrated) which engages and rotates the adjustment ring 38 which controls the iris 36 (FIGS. 2 and 3). Suitable iris control and drive systems are illustrated in U.S. Pat. Nos. 3,820,882 and 4,300,167, the disclosures of which are incorporated herein by reference. The drive unit 70 includes a cable 72 which is attached to a remote light sensor (not illustrated) which is mounted within the video camera.

Although the foregoing invention has been described in detail for purposes of clarity of understanding, it will be obvious that certain modifications may be practiced within the scope of the appended claims.

What is claimed is:

1. An adapter system for mounting a video camera on a microscope beam splitter assembly, said adapter comprising:

a main body housing having an internal beam splitter oriented to receive light along an axial beam path and to reflect a portion of said light along a transverse beam path;

a nose piece assembly detachably mounted on the main body housing and having an adjustable iris along the axial beam path; and a plurality of lens cartridges capable of being interchangeably mounted within the nose piece assembly along the axial beam path between the adjustable iris and the beam splitter, wherein different lens cartridges have different focal length magnifications.

2. An adapter system as in claim 1, having a 35-mm camera mount receptacle formed in the main body housing and aligned with the axial beam path on a side of the beam splitter opposite to the nose piece, and further comprising a detachably secured lens holder and a plurality of lens assemblies, wherein the lens assemblies are matched with the lens cartridge to provide a preselected focal length to an attached 35-mm camera body.

3. An adapter system as in claim 1, wherein the lens cartridges are cylinders which are threadably attached to the main body housing and wherein the nose piece is mounted over the cylinder.

4. An adapter system as in claim 3, having a video mount receptacle formed in the main body housing and aligned with the transverse beam path, and further comprising a bayonet mount ring having means for detachably securing to the video mount receptacle and a C-mount ring having means for detachably securing to the video mount receptacle.

5. An adapter system as in claim 4, further comprising means at the video mount receptacle for axially translating a mount ring secured therein, whereby an attached video camera can be focused.

* * * * *